United States Patent
Chen et al.

(10) Patent No.: US 10,862,819 B2
(45) Date of Patent: Dec. 8, 2020

(54) BROADCAST MESSAGE MANAGEMENT METHOD AND APPARATUS

(71) Applicant: HUAWEI TECHNOLOGIES CO., LTD., Guangdong (CN)

(72) Inventors: Qiulin Chen, Shanghai (CN); Yunjian Ying, Shenzhen (CN); Hui Wang, Hangzhou (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/287,706

(22) Filed: Feb. 27, 2019

(65) Prior Publication Data

US 2019/0199648 A1 Jun. 27, 2019

Related U.S. Application Data

(63) Continuation of application No. PCT/CN2017/098966, filed on Aug. 25, 2017.

(30) Foreign Application Priority Data

Aug. 31, 2016 (CN) .......................... 2016 1 0799210

(51) Int. Cl.
*H04L 12/863* (2013.01)
*H04L 12/18* (2006.01)
*H04L 12/927* (2013.01)

(52) U.S. Cl.
CPC ...... *H04L 47/6215* (2013.01); *H04L 12/1881* (2013.01); *H04L 47/806* (2013.01)

(58) Field of Classification Search
CPC ............. H04L 47/6215; H04L 12/1881; H04L 47/806

(Continued)

(56) References Cited

U.S. PATENT DOCUMENTS 9,625,968 B2 4/2017 Yun et al.
2002/0046231 A1* 4/2002 Law .................. G06F 9/546
718/107

(Continued)

FOREIGN PATENT DOCUMENTS

CN 103491507 A 1/2014
CN 103593217 A 2/2014

(Continued)

OTHER PUBLICATIONS

International Search Report dated Oct. 30, 2017 in corresponding International Patent Application No. PCT/CN2017/098966 (7 pages).

(Continued)

*Primary Examiner* — Glenford J Madamba
(74) *Attorney, Agent, or Firm* — Fish & Richardson P.C.

(57) ABSTRACT

Embodiments of the present disclosure disclose a broadcast message management method, including: receiving a broadcast message sent by a target application program; determining a user experience assurance priority of the target application program, and determining a target broadcast queue corresponding to the target application program; saving the broadcast message in the target broadcast queue; and when a broadcast message scheduling request is received, scheduling, according to a target broadcast message scheduling priority corresponding to the target broadcast queue, the broadcast message stored in the target broadcast queue. The embodiments of the present disclosure further disclose a broadcast message management apparatus.

6 Claims, 7 Drawing Sheets

(58) Field of Classification Search
USPC .......................................................... 709/207
See application file for complete search history.

(56) References Cited

U.S. PATENT DOCUMENTS

| | | |
|---|---|---|
| 2004/0131014 A1 | 7/2004 | Thompson, III et al. |
| 2006/0212917 A1 | 9/2006 | Boucher et al. |
| 2011/0040913 A1 | 2/2011 | Chung et al. |
| 2014/0068779 A1 | 3/2014 | Tan et al. |
| 2015/0113579 A1 | 4/2015 | Baek |
| 2020/0019449 A1* | 1/2020 | Guo ........................ G06F 9/546 |

FOREIGN PATENT DOCUMENTS

| | | |
|---|---|---|
| CN | 103826008 A | 5/2014 |
| CN | 104994481 A | 10/2015 |

OTHER PUBLICATIONS

Written Opinion of the International Searching Authority dated Oct. 30, 2017 in corresponding International Patent Application No. PCT/CN2017/098966 (3 pages).
Extended European Search Report dated Apr. 15, 2019 in corresponding European Patent Application No. 17845322.1 (6 pages).
International Search Report dated Oct. 30, 2017 in corresponding International Application No. PCT/CN2017/098966.

* cited by examiner

BROADCAST MESSAGE MANAGEMENT METHOD AND APPARATUS

CROSS-REFERENCE TO RELATED APPLICATIONS

This application is a continuation of International Application No. PCT/CN2017/098966, filed on Aug. 25, 2017, which claims priority to Chinese Patent Application No. 201610799210.0, filed on Aug. 31, 2016. The disclosures of the aforementioned applications are hereby incorporated by reference in their entireties.

TECHNICAL FIELD

The present disclosure relates to the field of communications technologies, and in particular, to a broadcast message management method and apparatus.

BACKGROUND

Broadcast is an information transmission mechanism that is widely applied to an application program of an Android operating system or between application programs. In the Android operating system, after receiving a broadcast message, an activity manager service (AMS) saves the broadcast message in a broadcast queue in the AMS, and when scheduling the broadcast message, reads the broadcast message from the broadcast queue and broadcasts the broadcast message. When it takes a relatively long time to process a broadcast message, processing of another subsequent broadcast message in the broadcast queue is delayed. Consequently, an application program that receives the another subsequent broadcast message has a delay in message receiving, or runs in a stalled manner.

In the prior art, a pair of broadcast queues are used. One broadcast queue is used to store a broadcast message generated by a foreground application program, and the other broadcast queue is used to store a broadcast message generated by a background application program. The broadcast messages from the foreground application program and the background application program are separately stored, to alleviate impact exerted by processing of the broadcast message from the background application program on processing of the broadcast message from the foreground application program, and alleviate running stalling of the foreground application program. However, in the prior art, only the foreground application program and the background application program are distinguished, various types of application programs included in the foreground application program cannot be distinguished from each other, and various types of application programs included in the background application program cannot be distinguished from each other either. Broadcast messages generated by different application programs that belong to the foreground application program cannot be differentially processed, or broadcast messages generated by different application programs that belong to the background application program cannot be differentially processed. Consequently, immediate processing of a broadcast message from an important application program still cannot be ensured, running stalling or a delay in message receiving cannot be avoided in the important application program, and applicability is low.

SUMMARY

This application provides a broadcast message management method and apparatus, so as to improve broadcast message processing efficiency, improve broadcast message management applicability, and improve user experience of a terminal.

According to a first aspect, a broadcast message management method is provided, where the method is used to manage a broadcast message sent by a foreground application program of a terminal or a broadcast message sent by a background application program of a terminal, and the method may include: receiving a broadcast message sent by a target application program; determining a user experience assurance priority of the target application program, and determining a target broadcast queue corresponding to the user experience assurance priority of the target application program from at least two preset broadcast queues, where each of the at least two broadcast queues is corresponding to a broadcast message scheduling priority; saving the broadcast message in the target broadcast queue; and when a broadcast message scheduling request is received, scheduling, according to a target broadcast message scheduling priority corresponding to the target broadcast queue, the broadcast message stored in the target broadcast queue.

In this application, when the broadcast message is received, the broadcast message may be stored in the target broadcast queue according to the user experience assurance priority of the target application program that sends the broadcast message. The target broadcast queue is further corresponding to the broadcast message scheduling priority. During broadcast message scheduling, broadcast message scheduling processing may be further performed according to the broadcast message scheduling priority. In this application, broadcast messages are stored as different classes according to user experience assurance priorities of application programs, so as to improve broadcast message storage controllability. A broadcast message scheduling priority is set for the broadcast queue that stores the broadcast message, so that controllability of the broadcast message scheduling priority is improved, and further, broadcast message processing efficiency is improved, and user experience of the application program is improved. The target application program provided in this application may be a background application program or may be a foreground application program. That is, the method provided in this application may be used to manage a broadcast message from the foreground application program, or may be used to manage a broadcast message from the background application program. Therefore, operations are flexible, and broadcast message management applicability is improved.

The user experience assurance priority provided in this application is used to indicate a degree to which the application program affects user experience, and a higher degree to which user experience is affected indicates a higher user assurance priority. Specifically, the user experience assurance priority may be determined by use frequency of the application program, or a degree to which a response delay of the application program affects user experience. For example, if the application program is used more frequently, the application program has a higher user experience assurance priority; or if a response delay of a broadcast message from the application program brings more inconvenience to a user, the application program has a higher user experience assurance priority.

With reference to the first aspect, in a first possible implementation, before the broadcast message sent by the target application program is received, application programs of the terminal may be further classified into application programs of at least two user experience assurance priorities according to user experience assurance priorities of the application programs, where the application programs of at least two user experience assurance priorities include a first application program of a first user experience assurance priority and a second application program of a second user experience assurance priority, and the first user experience assurance priority is higher than the second user experience assurance priority. A first broadcast queue corresponding to the first application program and a second broadcast queue corresponding to the second application program may be further created, and a first broadcast message scheduling priority of the first broadcast queue and a second broadcast message scheduling priority of the second broadcast queue are set, where the first broadcast message scheduling priority is higher than the second broadcast message scheduling priority. When the target broadcast queue corresponding to the user experience assurance priority of the target application program is determined from the at least two preset broadcast queues, if the target application program is the first application program, the first broadcast queue is determined as the target broadcast queue, or if the target application program is the second application program, the second broadcast queue is determined as the target broadcast queue.

In this application, multiple broadcast queues may be pre-created. Each broadcast queue is used to store a broadcast message sent by an application program of a type, and each broadcast queue is corresponding to a broadcast message scheduling priority. Therefore, operation flexibility of broadcast message storage is improved, and broadcast message scheduling controllability and processing efficiency are improved.

With reference to the first possible implementation of the first aspect, in a second possible implementation, the first application program includes a system application program and a preset application program of the terminal; the first broadcast queue includes a first subqueue used to store a broadcast message from the system application program and a second subqueue used to store a broadcast message from the preset application program; and when the target broadcast queue corresponding to the user experience assurance priority of the target application program is determined from the at least two preset broadcast queues, if the target application program is the system application program of the terminal, the first subqueue of the first broadcast queue is determined as the target broadcast queue, or if the target application program is the preset application program, the second subqueue of the first broadcast queue is determined as the target broadcast queue.

In this application, a scheduling priority of a broadcast message from the system application program or the preset application program of the terminal may be set to be higher than scheduling priorities of broadcast messages from other application programs, so as to better ensure smooth running of a system and improve user experience. In addition, in this application, broadcast messages from the system application program and the preset application program may be separately stored, so as to better ensure scheduling contention of the broadcast messages from the system application program and the preset application program, ensure a more flexible broadcast message scheduling operation, and improve user experience of the terminal.

With reference to the first possible implementation of the first aspect, in a third possible implementation, the application programs of at least two user experience assurance priorities further include a third application program of a third user experience assurance priority. In a broadcast message management process, if a quantity of broadcast messages from a specified application program that are received within a preset time threshold is greater than a preset quantity threshold, the specified application program is determined as the third application program; a third broadcast queue corresponding to the third application program is created, the third broadcast queue is determined as the target broadcast queue, and a broadcast message from the third application program is saved in the third broadcast queue; and a scheduling priority of the broadcast message stored in the third broadcast queue is set as a third broadcast message scheduling priority, where the third broadcast message scheduling priority is lower than the second broadcast message scheduling priority.

In this application, a separate broadcast queue may be further created for an abnormal application program that sends, within the preset time threshold, broadcast messages whose quantity exceeds an expected quantity. The broadcast messages sent by the abnormal application program are stored in the created separate broadcast queue, and a broadcast message scheduling priority of the broadcast queue is set to be lower than broadcast message scheduling priorities of other broadcast queues, so as to reduce scheduling resource contention, avoid impact exerted by a large quantity of broadcast messages sent by the abnormal application program on processing of a broadcast message sent by another application program, and improve user experience of the terminal.

With reference to the third possible implementation of the first aspect, in a fourth possible implementation, in a broadcast message management process, if all broadcast messages stored in the third broadcast queue are scheduled and executed, and it is detected that the specified application program exits running, the third broadcast queue is deleted.

In this application, after all the broadcast messages from the abnormal application program are processed, and the abnormal application program exits, the queue that stores the broadcast messages from the abnormal application program may be deleted to save storage space of the terminal.

With reference to the second possible implementation of the first aspect, in a fifth possible implementation, the broadcast message further carries message type identification of the broadcast message; and the target broadcast queue includes at least two broadcast message linked lists, where the at least two broadcast message linked lists include a first linked list used to store a broadcast message of a first message type and a second linked list used to store a broadcast message of a second message type. When the broadcast message is stored in the target broadcast queue, a type of the broadcast message may be determined according to the message type identification of the broadcast message; and if the type of the broadcast message is the first message type, the broadcast message is stored in the first linked list; or if the type of the broadcast message is the second message type, the broadcast message is stored in the second linked list.

In this application, different links in a broadcast queue may be set according to message types of broadcast messages, so that broadcast messages of different message types are stored in corresponding broadcast message links. Therefore, a broadcast message type feature is adapted to, and applicability of the broadcast message management method is improved.

With reference to the third possible implementation of the first aspect, in a sixth possible implementation, the third broadcast queue includes at least two broadcast message linked lists. The at least two linked lists include a third linked list used to store a broadcast message of a third message type and a fourth linked list used to store a broadcast message of a fourth message type. In a broadcast message management process, a type of a specified broadcast message may be determined according to message type identification that is carried in the specified broadcast message sent by the third application program. If the type of the specified broadcast message is the third message type, the specified broadcast message is stored in the third linked list. If the type of the specified broadcast message is the fourth message type, the specified broadcast message is stored in the fourth linked list.

In this application, different links in a broadcast queue may be set according to message types of broadcast messages, so that broadcast messages of different message types are stored in corresponding broadcast message links. Therefore, a broadcast message type feature is adapted to, and applicability of the broadcast message management method is improved.

According to a second aspect, a broadcast message management apparatus is provided, where the management apparatus is configured to manage a broadcast message sent by a foreground application program of a terminal or a broadcast message sent by a background application program of a terminal, and the management apparatus may include: a receiving module, a determining module, a storage module, and a scheduling module. The receiving module receives a broadcast message sent by a target application program; the determining module determines a user experience assurance priority of the target application program corresponding to the broadcast message received by the receiving module, and determines a target broadcast queue corresponding to the user experience assurance priority of the target application program from at least two preset broadcast queues, where each of the at least two broadcast queues is corresponding to a broadcast message scheduling priority; the storage module saves the broadcast message received by the receiving module in the target broadcast queue determined by the determining module; and when a broadcast message scheduling request is received, the scheduling module schedules, according to a target broadcast message scheduling priority corresponding to the target broadcast queue, the broadcast message saved in the target broadcast queue by the storage module.

With reference to the second aspect, in a first possible implementation, the management apparatus further includes: a classification module and a setting module. The classification module classifies application programs of the terminal into application programs of at least two user experience assurance priorities according to user experience assurance priorities of the application programs. The application programs of at least two user experience assurance priorities include a first application program of a first user experience assurance priority and a second application program of a second user experience assurance priority, and the first user experience assurance priority is higher than the second user experience assurance priority. The setting module creates a first broadcast queue corresponding to the first application program obtained by the classification module by means of classification and a second broadcast queue corresponding to the second application program, and sets a first broadcast message scheduling priority of the first broadcast queue and a second broadcast message scheduling priority of the second broadcast queue, where the first broadcast message scheduling priority is higher than the second broadcast message scheduling priority. When it is determined that the target application program is the first application program, the determining module determines the first broadcast queue as the target broadcast queue; or when it is determined that the target application program is the second application program, determines the second broadcast queue as the target broadcast queue.

With reference to the first possible implementation of the second aspect, in a second possible implementation, the first application program includes a system application program and a preset application program of the terminal; the first broadcast queue includes a first subqueue used to store a broadcast message from the system application program and a second subqueue used to store a broadcast message from the preset application program; and when it is determined that the target application program is the system application program of the terminal, the determining module determines the first subqueue of the first broadcast queue as the target broadcast queue; or when it is determined that the target application program is the preset application program, determines the second subqueue of the first broadcast queue as the target broadcast queue.

With reference to the first possible implementation of the second aspect, in a third possible implementation, the application programs of at least two user experience assurance priorities further include a third application program of a third user experience assurance priority. When a quantity of broadcast messages from a specified application program that are received within a preset time threshold is greater than a preset quantity threshold, the determining module determines the specified application program as the third application program. The setting module creates a third broadcast queue corresponding to the third application program determined by the determining module, determines the third broadcast queue as the target broadcast queue, and saves a broadcast message from the third application program in the third broadcast queue by using the storage module, and sets a scheduling priority of the broadcast message stored in the third broadcast queue as a third broadcast message scheduling priority, where the third broadcast message scheduling priority is lower than the second broadcast message scheduling priority.

With reference to the third possible implementation of the second aspect, in a fourth possible implementation, when the scheduling module schedules and executes all broadcast messages stored in the third broadcast queue, and it is detected that the specified application program exits running, the setting module may further delete the third broadcast queue.

According to a third aspect, a terminal is provided, and the terminal may include a memory and a processor, where the memory is configured to store program code, and the processor is configured to invoke the program code stored in the memory to perform the following operations:

receiving a broadcast message sent by a target application program; determining a user experience assurance priority of the target application program, and determining a target broadcast queue corresponding to the user experience assurance priority of the target application program from at least two preset broadcast queues, where each of the at least two broadcast queues is corresponding to a broadcast message scheduling priority; saving the broadcast message in the target broadcast queue; and when a broadcast message scheduling request is received, scheduling, according to a target broadcast message scheduling priority corresponding to the target broadcast queue, the broadcast message stored in the target broadcast queue.

With reference to the third aspect, in a first possible implementation, the processor may further classify application programs of the terminal into application programs of at least two user experience assurance priorities according to user experience assurance priorities of the application programs, including a first application program of a first user experience assurance priority and a second application program of a second user experience assurance priority, where the first user experience assurance priority is higher than the second user experience assurance priority; create a first broadcast queue corresponding to the first application program and a second broadcast queue corresponding to the second application program, and set a first broadcast message scheduling priority of the first broadcast queue and a second broadcast message scheduling priority of the second broadcast queue, where the first broadcast message scheduling priority is higher than the second broadcast message scheduling priority; and when the target application program is the first application program, determine the first broadcast queue as the target broadcast queue; or when the target application program is the second application program, determine the second broadcast queue as the target broadcast queue.

With reference to the first possible implementation of the third aspect, in a second possible implementation, the first application program includes a system application program and a preset application program of the terminal; the first broadcast queue includes a first subqueue used to store a broadcast message from the system application program and a second subqueue used to store a broadcast message from the preset application program; and if the target application program is the system application program of the terminal, the processor determines the first subqueue of the first broadcast queue as the target broadcast queue; or if the target application program is the preset application program, determines the second subqueue of the first broadcast queue as the target broadcast queue.

With reference to the first possible implementation of the third aspect, in a third possible implementation, the application programs of at least two user experience assurance priorities further include a third application program of a third user experience assurance priority. If a quantity of broadcast messages from a specified application program that are received within a preset time threshold is greater than a preset quantity threshold, the processor determines the specified application program as the third application program; and the processor creates a third broadcast queue corresponding to the third application program, determines the third broadcast queue as the target broadcast queue, and saves a broadcast message from the third application program in the third broadcast queue; and further sets a scheduling priority of the broadcast message stored in the third broadcast queue as a third broadcast message scheduling priority, where the third broadcast message scheduling priority is lower than the second broadcast message scheduling priority.

With reference to the third possible implementation of the third aspect, in a fourth possible implementation, when all broadcast messages stored in the third broadcast queue are scheduled and executed, and it is detected that the specified application program exits running, the processor may further delete the third broadcast queue.

In this application, when the broadcast message is received, the broadcast message may be stored in the target broadcast queue according to the user experience assurance priority of the target application program that sends the broadcast message. The target broadcast queue is further corresponding to the broadcast message scheduling priority. During broadcast message scheduling, broadcast message scheduling processing may be further performed according to the broadcast message scheduling priority. In this application, broadcast messages are stored as different classes according to user experience assurance priorities of application programs, so as to improve broadcast message storage controllability. A broadcast message scheduling priority is set for the broadcast queue that stores the broadcast message, so that controllability of the broadcast message scheduling priority is improved, and further, broadcast message processing efficiency is improved, and user experience of the application program is improved. The target application program provided in this application may be a background application program or may be a foreground application program. That is, the method provided in this application may be used to manage a broadcast message from the foreground application program, or may be used to manage a broadcast message from the background application program. Therefore, operations are flexible, and applicability of the broadcast message management method is improved.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

A broadcast message management method provided in the embodiments of the present disclosure is mainly applied to a terminal device. The terminal device may also be referred to as user equipment (UE), a mobile station (MS), a mobile terminal ( ), or the like. Optionally, the terminal device (referred to as a terminal below) may have a capability of communicating with one or more core networks by using a radio access network (RAN). For example, the terminal may be a mobile phone (or referred to as a "cellular" phone), a computer with a mobility feature, or the like. For example, alternatively, the terminal may be a portable, pocket-sized, handheld, computer built-in, or in-vehicle mobile apparatus. It should be understood that, in addition to the mobile terminal, the broadcast message management method provided in the embodiments of the present disclosure may also be applied to a computer system of another type.

Figure 1:
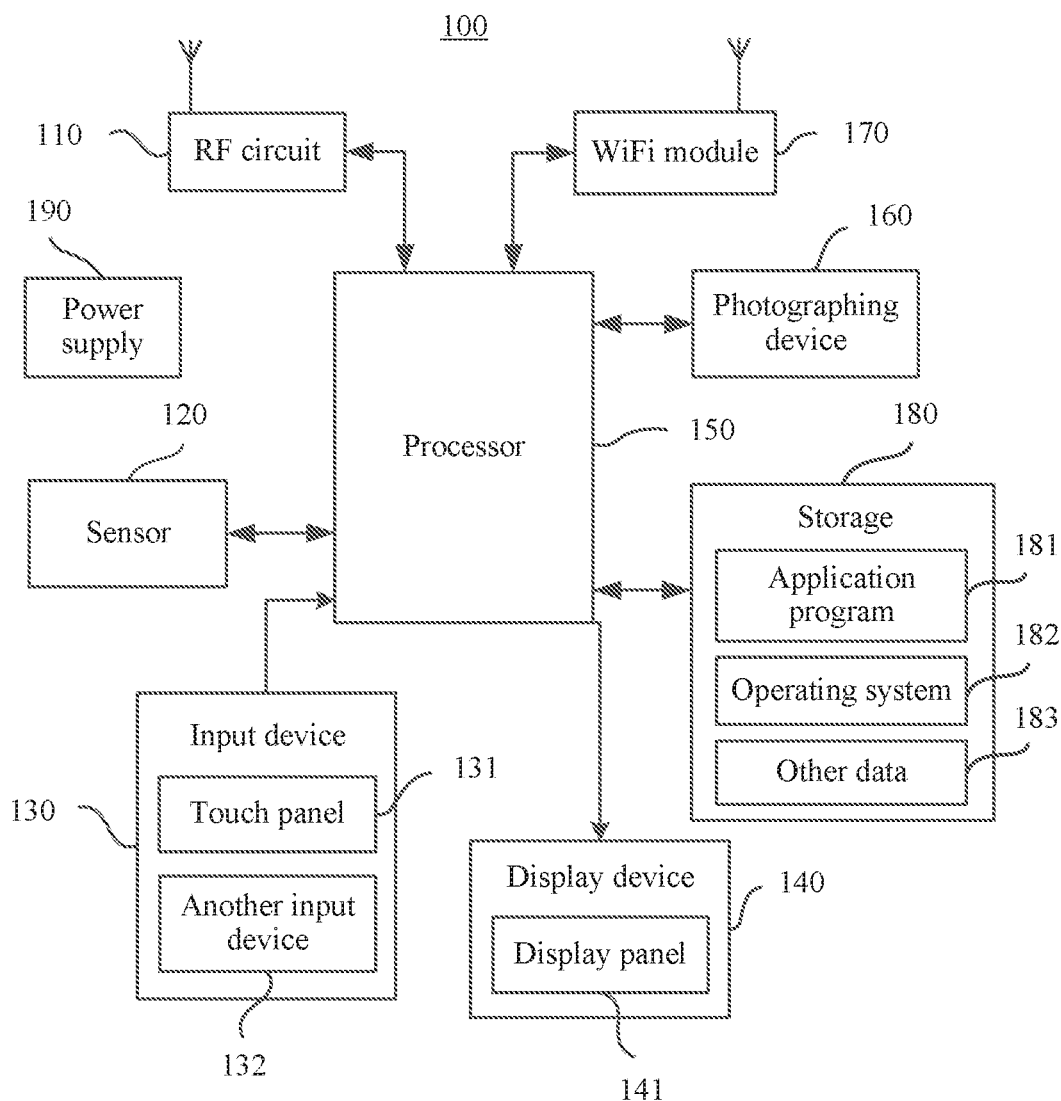
FIG. 1 is a schematic structural diagram of a terminal device used in an embodiment of the present disclosure.

Referring to FIG. 1, FIG. 1 is a schematic structural diagram of a terminal device according to an embodiment of the present disclosure. As shown in FIG. 1, a terminal device 100 includes a storage 180, a processor 150, and a display device 140. The storage 180 stores a computer program (or referred to as program code), and the computer program includes an operating system program 182, an application program 181, and the like. The processor 150 is configured to read the computer program in the storage 180, and then performs a method defined by the computer program. For example, the processor 150 reads the operating system program 182, so as to run an operating system and implement various functions of the operating system on the terminal device 100; or reads one or more application programs 181, so as to run an application or process a broadcast message from the application program on the terminal device.

The processor 150 may include one or more processors. For example, the processor 150 may include one or more central processing units, or include one or more central processing units and one or more application processors. When the processor 150 includes multiple processors, the multiple processors may be integrated on a same chip, or may be separately independent chips. One processor may include one or more processor cores (or referred to as processing cores). Multiple cores are used for description in the following embodiments. However, the broadcast message management method provided in the embodiments of the present disclosure may also be applied to a single-core processor. Multiple application programs are run concurrently by using a time-division working principle of the single-core processor.

In addition, the storage 180 stores other data 183 in addition to the computer program. The other data 183 may include data generated after the operating system 182 or the application program 181 is run, and the like. The data includes system data (for example, an operating system configuration parameter) and user data. For example, a broadcast message generated by each application program is typical user data.

The storage 180 usually includes a memory and an external storage. The memory may be a random access memory (RAM), a read-only memory (ROM), a cache (CACHE), or the like. The external storage may be a hard disk, an optical disc, a USB flash drive, a floppy disk, a tape drive, or the like. The computer program is usually stored in the external storage. Before performing processing, the processor loads the computer program from the external storage to the memory.

The operating system program 182 includes a computer program that can implement the broadcast message management method provided in the embodiments of the present disclosure, so that after the processor 150 reads the operating system program 182 and runs the operating system, the operating system may have a broadcast message management function provided in the embodiments of the present disclosure.

The terminal device 100 may further include an input device 130, configured to: receive input digital information or character information, a contact touch operation/non-contact gesture, generate signal input that is related to user settings and function control of the terminal device 100, and the like. Specifically, in this embodiment of the present disclosure, the input device 130 may include a touch panel 131. The touch panel 131, also referred to as a touchscreen, may collect a touch operation (such as an operation performed by a user on or near the touch panel 131 by using any appropriate object or accessory such as a finger or a stylus) of the user on or near the touch panel 131, and drive a corresponding connection apparatus according to a preset program. Optionally, the touch panel 131 may include two parts: a touch detection apparatus and a touch controller. The touch detection apparatus detects a touch position of the user, detects a signal brought by a touch operation, and transfers the signal to the touch controller. The touch controller receives touch information from the touch detection apparatus, converts the touch information into touch point coordinates, then sends the touch point coordinates to the processor 150, and can receive and execute a command sent by the processor 150. For example, if the user double taps an icon of an application program on the touch panel 131 with a finger, the touch detection apparatus detects a signal brought by the double tap, and transfers the signal to the touch controller. Then, the touch controller converts the signal into coordinates, and sends the coordinates to the processor 150. The processor 150 performs an operation such as starting the application program according to the coordinates and a type (for example, the double tap) of the signal, and finally displays an operating interface of the application program on a display panel 141, so as to "start" the application program.

The touch panel 131 may be implemented in multiple types such as a resistive type, a capacitive type, infrared, and a surface acoustic wave. In addition to the touch panel 131, the input device 130 may further include another input device 132. The another input device 132 may include but be not limited to one or more of a physical keyboard, a function key (such as a volume control key or an on/off key), a trackball, a mouse, a joystick, or the like.

The display device 140 included in the terminal device 100 includes the display panel 141, configured to display information that is input by the user or information provided for the user and various menu interfaces of the terminal device 100. In this embodiment of the present disclosure, the display panel 141 is mainly configured to display information such as a user operation interface of an application program. Optionally, the display panel 141 may be configured in a form of a liquid crystal display (LCD), an organic light-emitting diode (OLED), or the like. In some other embodiments, the touch panel 131 may cover the display panel 141, so as to form a touch display screen.

In addition, the terminal device 100 may further include a power supply 190 configured to supply power to other modules and a photographing device 160 configured to shoot a photograph or a video. The terminal device 100 may further include one or more sensors 120, for example, a gravity sensor, an acceleration sensor, or a light sensor. The terminal device 100 may further include a radio frequency (RF) circuit 110, configured to perform network communication with a wireless network device, and may further include a WiFi module 170, configured to perform WiFi communication with another device, and so on.

In the following embodiments, a terminal is used as an execution body to describe a broadcast message management method and apparatus provided in the embodiments of the present disclosure. The broadcast message management method provided in the embodiments of the present disclosure may be implemented in the operating system program 182 shown in FIG. 1.

In an Android operating system, application programs generate various broadcast messages in a running process. For example, an application program that is included in a terminal and that is used to monitor a use status of a battery sends a broadcast message during use of the battery, and a short message service message module also generates a broadcast message when receiving information. An application program developer may also monitor a broadcast message sent during running of an application program, and may further perform an operation such as program logic processing according to the broadcast message. In this information transmission mechanism of broadcasting, a broadcast message may be received by one or more application programs, or may not be received by any application program. That is, in this information transmission mechanism of broadcasting, a broadcast message sender does not care about whether a receiver receives data, or how a receiver processes data.

In the Android operating system, a broadcast message sent by the broadcast message sender may be prestored in an AMS, and then the AMS instructs a broadcast message monitoring object (that is, a broadcast message receiver) to process the broadcast message. In the AMS, the broadcast message may be stored in a queue (referred to as a broadcast queue below) that is set in the AMS. Enqueue (that is, the message is saved in the queue) and dequeue (that is, the message is output from the queue) of the broadcast message are triggered by different processes, and an AMS lock needs to be used in both enqueue and dequeue of the broadcast message. During specific implementation, serial broadcast (also referred to as ordered broadcast) messages need to be processed according to an enqueue time sequence of the serial broadcast messages. Parallel broadcast (also referred to as non-ordered broadcast) messages may be scheduled from a queue in parallel. Specific scheduling priorities may be determined according to a sequence of obtaining the AMS lock by the parallel broadcast messages by means of preemption, and a broadcast message that first obtains the AMS lock by means of preemption is scheduled first. When it takes a relatively long time to process serial broadcast messages (that is, the broadcast messages are transmitted in a serial mode) sent by an application program, processing of other subsequent broadcast messages in a broadcast queue is delayed. Consequently, an application program corresponding to the other serial broadcast messages has a delay in message receiving or runs in a stalled manner. If an application program sends relatively many parallel broadcast messages (that is, the broadcast messages are transmitted in a parallel mode), AMS lock contention may be intensified because the parallel broadcast messages preempt the AMS during broadcast message scheduling. Consequently, processing time validity of each application program cannot be ensured, and it is likely that the application program runs in a stalled manner or has a delay in message receiving.

Figure 2:
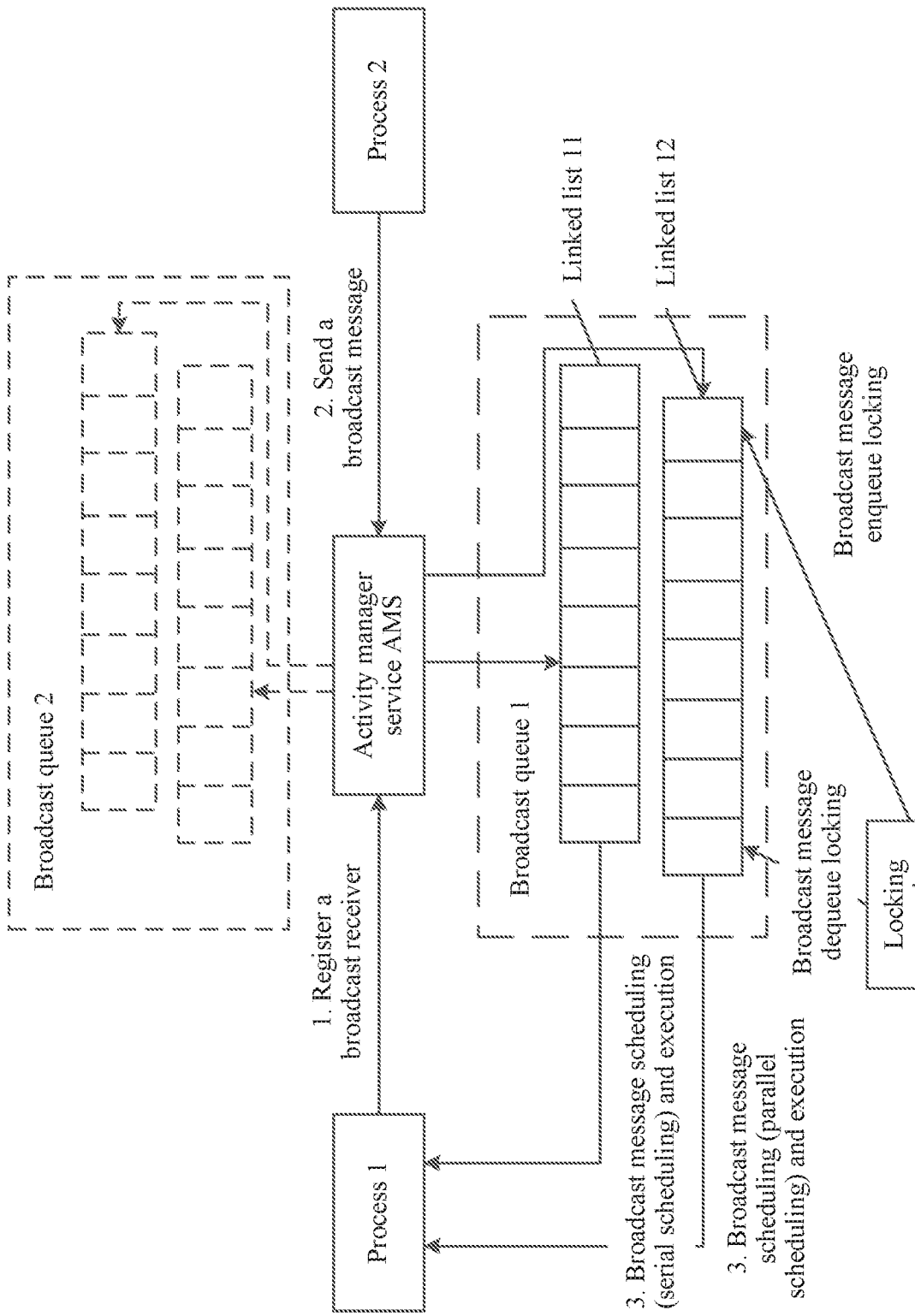
FIG. 2 is a schematic interaction diagram of transmission of an existing broadcast message.

In the prior art, a pair of global broadcast queues (including two broadcast queues) are used. One broadcast queue is used to store a broadcast message generated by a foreground application program, and the other broadcast queue is used to store a broadcast message generated by a background application program. The broadcast messages from the foreground application program and the background application program are separately stored, to alleviate impact exerted by processing of the broadcast message from the background application program on processing of the broadcast message from the foreground application program, and alleviate running stalling of the foreground application program. Referring to FIG. 2, FIG. 2 is a schematic interaction diagram of transmission of an existing broadcast message. As shown in FIG. 2, in an existing broadcast message transmission solution, an AMS uses a pair of broadcast queues to store broadcast messages. The pair of broadcast queues include a broadcast queue (for example, a broadcast queue 1 shown in FIG. 2) used to store a broadcast message from a foreground application program and a broadcast queue (for example, a broadcast queue 2 shown in FIG. 2) used to store a broadcast message from a background application program. Each broadcast queue includes two linked lists. One linked list (for example, a linked list 11 shown in FIG. 2) is used to store ordered broadcast messages (that is, serial broadcast messages), and the other linked list (for example, a linked list 12 shown in FIG. 2) is used to store non-ordered broadcast messages (that is, parallel broadcast messages).

During broadcast message transmission, an application program (which may be specifically a process, for example, a process 1 shown in FIG. 2) that needs to monitor or process a broadcast message needs to register a broadcast receiver with the AMS in advance (for example, step 1 shown in FIG. 2). Specifically, the process 1 may dynamically register a broadcast receiver with the AMS by using a broadcast receiver registration function (for example, register-Receiver), or statically register a broadcast receiver with the AMS in AndroidManifest.xml (that is, a list file included in an Android application program). The AMS stores all broadcast receivers in a member variable (for example, an mReceiverResolver member variable). An application program (which may be specifically a process, for example, a process 2 shown in FIG. 2) that sends a broadcast message sends a broadcast message to the AMS (for example, step 2 shown in FIG. 2) by sending a broadcast function (for example, sendBroadcast). The AMS first finds all receivers (that is, broadcast receivers that are included in all broadcast receivers registered with the ASM and that monitor the broadcast message) corresponding to the broadcast message by querying the mReceiverResolver member variable, and then generates a BroadcastRecord (that is, a broadcast record). Further, the AMS puts the broadcast message into a corresponding broadcast message linked list according to a type of the receivers of the broadcast message that are recorded in the BroadcastRecord and a type of the broadcast message. The type of the receivers of the broadcast message includes a foreground application program (or a foreground process), a background application program (or a background process), and the like. The type of the broadcast message includes serial broadcast messages (that is, ordered broadcast messages), parallel broadcast messages (that is, non-ordered broadcast messages), or the like.

After storing the broadcast message in the corresponding broadcast queue linked list, the AMS may sequentially read serial broadcast messages from a broadcast queue linked list (that is, a serial broadcast linked list) of the serial broadcast messages according to a broadcast message scheduling time sequence and by using a broadcast message scheduling handler, or read all broadcast messages from a broadcast queue linked list (that is, a parallel broadcast linked list) of parallel broadcast messages by using a broadcast message scheduling handler. Further, the AMS instructs, by using a communications mechanism such as binder, each broadcast message receiver application program to process the broadcast message. Specifically, the AMS may remotely invoke, by using the binder, a broadcast receiving processing function (that is, an onReceiver function) registered by the broadcast receiver with the AMS to process the broadcast message (for example, step 3 shown in FIG. 2).

It can be learned from the foregoing description that application program types are not distinguished when a pair of broadcast queues (only a foreground application program and a background application program are distinguished) are used in the existing technical solution. When an application program has excessive broadcast messages (especially ordered broadcast messages) or a broadcast message has excessive receivers, it takes a relatively long time to process the broadcast message. Consequently, a system is stalled, processing of another broadcast message is delayed, and so on. For example, a system application program and all other application programs share a pair of broadcast message queues, all serial broadcast messages are stored in a serial broadcast linked list, and all parallel broadcast messages are stored in a parallel broadcast linked list. When a background application program sends excessive serial broadcast messages, an AMS needs a relatively long time to process the broadcast messages sent by the background application program because the serial broadcast linked list may be excessively long. Consequently, an AMS lock is occupied for a relatively long time because of processing of the broadcast messages sent by the background application program, a broadcast message from a foreground application program is not processed because the broadcast message fails to obtain the AMS lock by means of preemption, and a problem such as running stalling of the foreground application program is easily caused. Further, when the foreground application program or the background application program sends excessive parallel broadcast messages, because the AMS lock needs to be possessed to access the parallel broadcast linked list in an enqueue management process of the broadcast messages or a dequeue management process of the broadcast messages, excessive broadcast messages stored in the parallel broadcast linked list further intensify AMS lock contention, and a problem such as running stalling of an application program is easily caused.

To differentially process broadcast messages sent by application programs of different application types, and ensure smooth running of a system application program or a key application program, the embodiments of the present disclosure provide a broadcast message management method and apparatus, so that a broadcast message sent by a foreground application program or a broadcast message sent by a background application program can be differentially stored and scheduled according to a sequence of user experience assurance priorities of the application programs, to improve broadcast message management applicability. The following describes, with reference to FIG. 3 to FIG. 8, the broadcast message management method and apparatus provided in the embodiments of the present disclosure.

Figure 3:
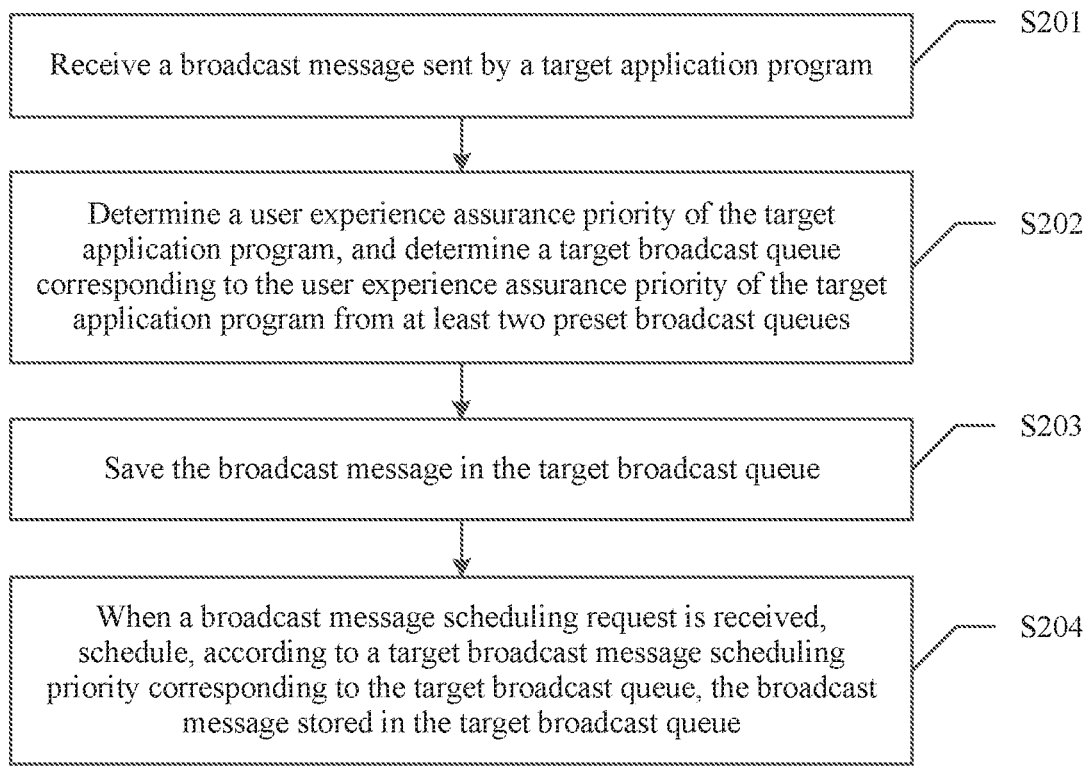
FIG. 3 is a schematic flowchart of a broadcast message management method according to an embodiment of the present disclosure.

Referring to FIG. 3, FIG. 3 is a schematic flowchart of a broadcast message management method according to an embodiment of the present disclosure. The method provided in this embodiment of the present disclosure includes the following steps.

S201. Receive a broadcast message sent by a target application program.

During specific implementation, the broadcast message management method provided in this embodiment of the present disclosure is applicable to management of a broadcast message from a foreground application program of a terminal, and is also applicable to management of a broadcast message from a background application program of the terminal. During specific implementation, the terminal may separately set multiple broadcast queues for the foreground application program and the background application program. Broadcast queues of the foreground application program and the background application program may be set in pairs, or may be separately set according to a requirement. No limitation is imposed herein. In multiple broadcast queues corresponding to the foreground application program or multiple broadcast queues corresponding to the background application program, different broadcast queues are used to store broadcast messages sent by application programs of different types. Each broadcast queue includes multiple linked lists, and different linked lists in a same broadcast queue are used to store broadcast messages that are of a same application program type and different broadcast message types.

In some feasible implementations, after receiving the broadcast message, the terminal may first determine whether the broadcast message comes from the foreground or the background, and may further determine to store the broadcast message in a broadcast queue corresponding to the foreground application program or store the broadcast message in a broadcast queue corresponding to the background application program. Specifically, the terminal may determine, according to foreground and background statuses of a registered broadcast receiver (that is, a broadcast message monitor) stored in an AMS, that the broadcast message is a foreground broadcast message or a background broadcast message. Further, the terminal may use the broadcast message management method provided in this embodiment of the present disclosure to determine a specific broadcast queue in which a broadcast message is stored, so as to implement targeted management on the broadcast message, and may further determine information such as a scheduling priority of the broadcast message by storing the broadcast message. A broadcast message sent by the foreground application program is used as an example for description below. Certainly, the following specific implementations are also applicable to management of a broadcast message sent by the background application program. No limitation is imposed herein.

In some feasible implementations, the broadcast message management method provided in this embodiment of the present disclosure may be performed by a module such as the AMS in the terminal, or another module that has a broadcast message management function. No limitation is imposed herein. In this embodiment of the present disclosure, the AMS is used as an example for description. During specific implementation, when sending a broadcast message to the AMS, an application program of the terminal may add identification information such as user identification (UID) or a package name (English: Package Name, PKGName) of the application program to the broadcast message. The identification information such as the UID or the PKGName of the application program may be used to determine a name of the application program, and information such as a type of the application program (referred to as an application type for short) may be further determined. The application program that sends a broadcast message to the terminal may be one or more of all application programs built in the terminal.

One application program (that is, the target application program) is used as an example for description below.

In some feasible implementations, after receiving the broadcast message sent by the target application program, the AMS in the terminal may parse the broadcast message, and obtain identification information of the application program such as UID, a PKGName, use frequency data, or an application program type whitelist carried in the broadcast message. After obtaining the identification information of the application program that is carried in the broadcast message, the AMS may determine a type of the target application program and a user experience assurance priority of the application program according to the identification information.

It should be noted that the user experience assurance priority that is of the application program and that is provided in this embodiment of the present disclosure may be determined by use frequency of the application program or a degree to which a response delay of the application program affects user experience. For example, because a system application program is a necessary application program (determined according to UID or a PKGName of the application program) for system running, the system application program has highest use frequency, and whether the system application program runs smoothly has largest impact on a user, and therefore it may be determined that the system application program has a highest user experience assurance priority. Because an application program such as an instant messaging tool is an application program that is used by a user every day, an application program of this type also has relatively high use frequency, and whether the instant messaging tool runs smoothly also has relatively large impact on the user, and therefore it may be determined that the application program such as the instant messaging tool has a relatively high user experience assurance priority. For an application program that is less used by the user or whose smooth running has no obvious impact on the user, it may be determined that the application program has a relatively low user experience assurance priority. During specific implementation, the terminal may determine a user experience assurance priority of each application program in the terminal in this manner, and may further add identification information of the user experience assurance priority of each application program to a broadcast message sent by each application program, for example, an identifier such as "1" or "0" identifies a first user experience assurance priority (may be identified by "1") or a second user experience assurance priority (may be identified by "0"). Therefore, when the broadcast message from each application program is received, the user experience assurance priority of the application program can be determined. Further, the terminal may also determine the user experience assurance priority of each application program in the terminal in the foregoing implementation, and may further establish a correspondence between an identifier of each application program and the user experience assurance priority of the application program. Therefore, the user experience assurance priority of the application program may be determined when identification information such as UID of each application program is determined. During specific implementation, the terminal may further determine the user experience assurance priority of the application program in more implementations. A manner of determining the user experience assurance priority of the application program may be specifically determined according to an actual application scenario requirement or a technical requirement, and is not limited herein.

Further, in some feasible implementations, before receiving the broadcast message sent by the target application program, the AMS in the terminal may classify, in advance, all the application programs built in the terminal, so as to perform classified management on broadcast messages sent by the application programs. During specific implementation, the terminal may determine a key application program by using a whitelist mechanism, or may set, as a key application program according to information such as frequency of using the application programs in the terminal by the user, an application program whose use frequency is greater than a preset frequency threshold. Alternatively, the terminal may set an application program of an instant messaging type in the application programs as a key application program, or set, as a key application program, an application program that is sensitive to broadcast message receiving/sending or whose broadcast message receiving/sending has relatively large impact on user experience of the application program. The foregoing manners of setting the key application program are merely examples, and may be specifically determined according to an actual application program. No limitation is imposed herein. The key application program may be an application program of a highest user experience assurance priority, and has a same user experience assurance priority as the system application program of the terminal. Alternatively, the system application program of the terminal has a highest user experience assurance priority, and a user experience assurance priority of the key application program is lower than the user experience assurance priority of the system application program, but is higher than user experience assurance priorities of other application programs. The user experience assurance priority of the key application program may be specifically determined according to an actual application scenario, and is not limited herein.

After determining the key application program, the terminal may generate a key application program list, and send the key application program list to the AMS, so that the AMS manages a broadcast message from the key application program. The key application program list includes at least one key application program determined in the foregoing setting manners. Further, the terminal may further update, in a timely manner according to information such as an application program newly installed during running of the terminal or a use habit of the user, the key application program included in the key application program list. For example, the application program included in the key application program list may be updated at a time point such as when the terminal is switched on or when the terminal is connected to a wireless network.

In some feasible implementations, after receiving the key application program list, the AMS may compare the application program of the terminal with the application program included in the key application program list, and determine, as a first application program of the first user experience assurance priority, an application program that is in the application programs built in the terminal and that is included in the key application program list. Further, to ensure smooth running of the terminal system, the AMS may also set the system application program of the terminal as the first application program of the first user experience assurance priority. Another application program that is not included in the key application program list and that is not the system application program of the terminal may be set as a second application program of the second user experience assurance priority. It should be noted that the key application program or the second application program may be a thirdparty application program that is downloaded from a platform such as an application market and that is installed by the terminal. No limitation is imposed herein.

Figure 4:
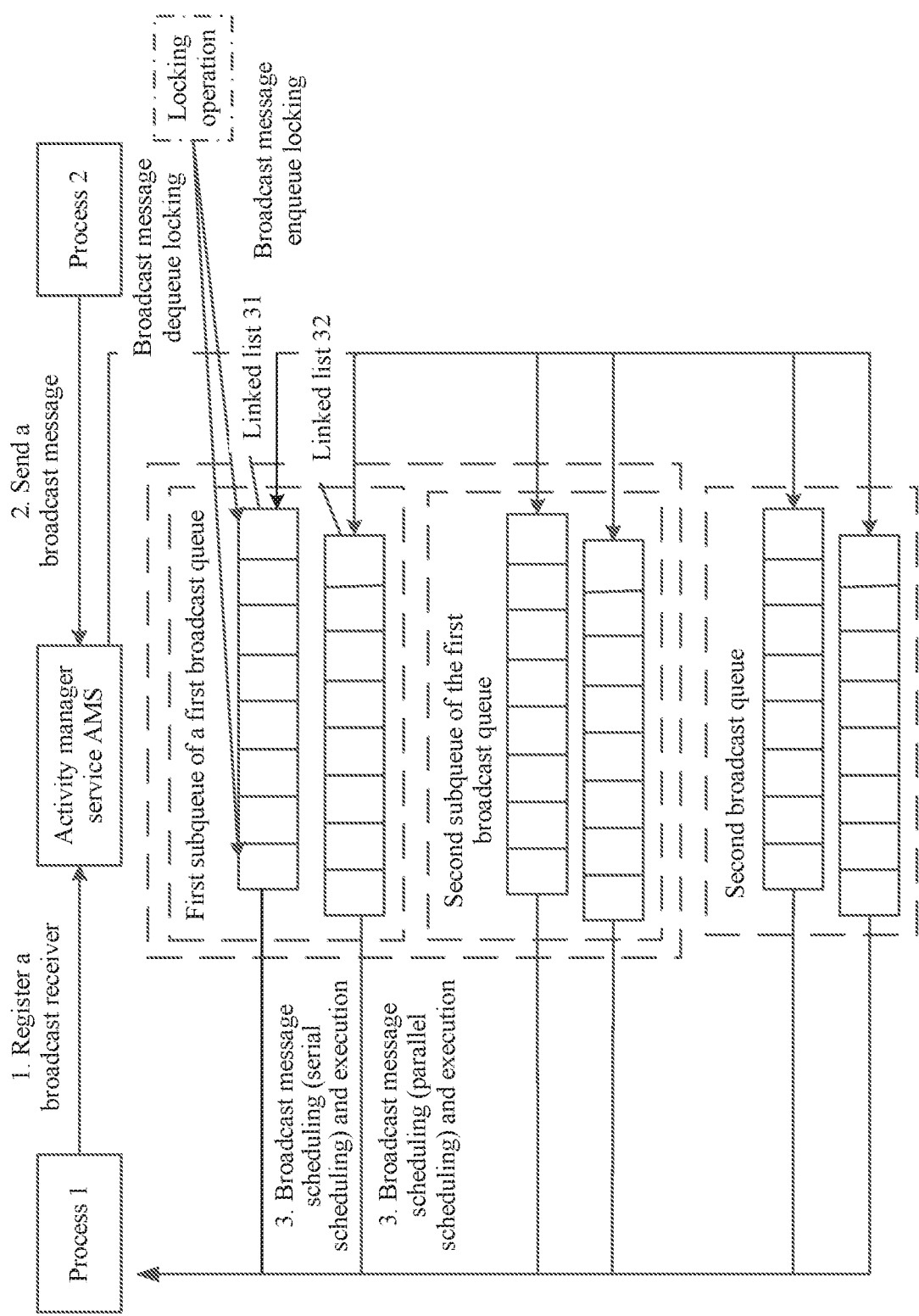
FIG. 4 is a schematic diagram of a broadcast queue according to an embodiment of the present disclosure.

Further, referring to FIG. 4, FIG. 4 is a schematic diagram of a broadcast queue according to an embodiment of the present disclosure. In some feasible implementations, after classifying the application programs of the terminal, the AMS may further create a broadcast queue for an application program of each type. The broadcast queue is used to store a broadcast message sent by the application program of each type. During specific implementation, the AMS may create a first broadcast queue corresponding to the first application program, a second broadcast queue corresponding to the second application program, and the like. The first broadcast queue and the second broadcast queue are two broadcast queues. The broadcast queues may have a same queue type, or may have different queue types, and this may be specifically determined according to an actual application requirement, and is not limited herein. Further, the AMS may set a broadcast message scheduling priority for each broadcast queue. The broadcast message scheduling priority is used to determine a scheduling priority of a broadcast message stored in the broadcast queue. Specifically, the AMS may set a first broadcast message scheduling priority of the first broadcast queue, and may further set a second broadcast message scheduling priority of the second broadcast queue. The first broadcast message scheduling priority is higher than the second broadcast message scheduling priority. That is, the AMS may set that scheduling priorities of broadcast messages sent by the key application program and the system application program included in the terminal are higher than scheduling priorities of broadcast messages sent by other application programs, so as to ensure smooth running of the key application program and the system application program, and ensure user experience of the key application program and the system application program.

During specific implementation, after pre-creating the first broadcast queue of the first application program and the second broadcast queue of the second application program, and setting the first broadcast message scheduling priority and the second broadcast message scheduling priority, when receiving a broadcast message, the AMS may determine, according to a type of an application program that sends the broadcast message, to store the broadcast message in the first broadcast queue or the second broadcast queue. In addition, information such as a scheduling priority of the broadcast message is also determined when the broadcast message is stored in a corresponding broadcast queue.

S202. Determine a user experience assurance priority of the target application program, and determine a target broadcast queue corresponding to the user experience assurance priority of the target application program from at least two preset broadcast queues.

In some feasible implementations, the AMS may determine the target application program according to information such as identification of an application program that is carried in the broadcast message, and may further match the target application program with each application program included in the key application program list to determine whether the target application program is included in the key application program list. If the target application program is included in the key application program list, it may be determined that the target application program is the first application program of the first user experience assurance priority. If the target application program is not included in the key application program list, it may be determined whether the target application program is the system application program of the terminal. If the target application program is the system application program of the terminal, it may be determined that the target application program is the first application program of the first user experience assurance priority. Otherwise, the target application program may be determined as the second application program of the second user experience assurance priority.

In some feasible implementations, if the target application program is the first application program, the first broadcast queue may be determined as the target broadcast queue. If the target application program is the second application program, the second broadcast queue may be determined as the target broadcast queue.

Further, as shown in FIG. 4, if the first application program includes the application program (which may be set as a preset application program) included in the key application program list and the system application program, two subqueues of the first broadcast queue may be created. One subqueue (which may be set as a second subqueue) is used to store a broadcast message from the preset application program. The other subqueue (which may be set as a first subqueue) is used to store a broadcast message from the system application program. During specific implementation, the first subqueue and the second subqueue of the first broadcast queue may be queues of a same queue format as the second broadcast queue, or may be queues of a different queue format from the second broadcast queue. Scheduling priorities of broadcast messages stored in the first subqueue and the second subqueue are the preset first broadcast message scheduling priority of the first broadcast queue. That is, the scheduling priorities of the broadcast messages in the first subqueue and the second subqueue of the first broadcast queue are the same, and are higher than the second broadcast message scheduling priority of the second broadcast queue. During specific implementation, the scheduling priorities of the broadcast messages in the first subqueue and the second subqueue of the first broadcast queue may be different. A specific sequence of the scheduling priorities of the broadcast messages in the first subqueue and the second subqueue may be determined according to an actual application scenario, and is not limited herein.

During specific implementation, if the AMS determines that the target application program is the system application program of the terminal, the first subqueue of the first broadcast queue may be determined as the target broadcast queue. If the AMS determines that the target application program is the preset application program, the second subqueue of the first broadcast queue may be determined as the target broadcast queue. After determining the target broadcast queue, the AMS may store the broadcast message in the target broadcast queue for subsequent scheduling and processing.

S203. Save the broadcast message in the target broadcast queue.

In some feasible implementations, broadcast messages sent by application programs may be further classified into ordered broadcast messages (or referred to as serial broadcast messages) and non-ordered broadcast messages (or referred to as parallel broadcast messages). The AMS may separately store received broadcast messages as ordered broadcast messages and non-ordered broadcast messages. During specific implementation, each of the first broadcast queue and the second broadcast queue created by the AMS and subqueues of the first broadcast queue and the second broadcast queue may include at least two broadcast message linked lists. The at least two broadcast message linked lists include a first linked list and a second linked list. The first linked list is used to store a broadcast message of a first message type (for example, ordered broadcast messages). The second linked list is used to store a broadcast message of a second message type (for example, non-ordered broadcast messages). For example, as shown in FIG. 4, the AMS may set two linked lists for the first subqueue of the first broadcast queue. One linked list (for example, a linked list 31) is used to store ordered broadcast messages sent by the system application program. The other linked list (for example, a linked list 32) is used to store non-ordered broadcast messages sent by the system application program. Alternatively, the AMS may set more than two such as three or four linked lists for the first subqueue of the first broadcast queue. At least one of the linked lists is used to store ordered broadcast messages sent by the system application program. At least one of the linked lists is used to store non-ordered broadcast messages sent by the system application program.

In some feasible implementations, when sending broadcast messages, the application programs of the terminal may add message type identification of the broadcast messages to the broadcast messages, so that the AMS identifies and differentially stores the broadcast messages. During specific implementation, when saving the broadcast message in the target broadcast queue, the AMS may first determine a message type of the broadcast message. If the broadcast message is a broadcast message of the first message type (for example, ordered broadcast messages), the broadcast message may be stored in the first linked list (that is, a linked list used to store the ordered broadcast messages) in the target broadcast queue. If the broadcast message is a broadcast message of the second message type (for example, non-ordered broadcast messages), the broadcast message may be stored in the second linked list (that is, a linked list used to store the non-ordered broadcast messages) in the target broadcast queue.

It should be noted that scheduling priorities of broadcast messages stored in different linked lists in a same broadcast queue are the same. A linked list in which a broadcast message is specifically scheduled may be determined according to a scheduling manner in an actual application scenario, or a broadcast message may be randomly scheduled. After the AMS stores a broadcast message in a specific linked list, a scheduling priority of the broadcast message is determined according to a broadcast message scheduling priority corresponding to the linked list that stores the broadcast message. If the broadcast message belongs to ordered broadcast messages, after being stored in the linked list, the broadcast message needs to wait for scheduling according to a time sequence. That is, the broadcast message cannot be scheduled until another broadcast message ranked before the broadcast message is scheduled and processed. If the broadcast message belongs to non-ordered broadcast messages, after the broadcast message is stored in the linked list, broadcast messages in the linked list may be sequentially scheduled, and a current broadcast message can be scheduled before processing of a previous broadcast message is completed.

S204. When a broadcast message scheduling request is received, schedule, according to a target broadcast message scheduling priority corresponding to the target broadcast queue, the broadcast message stored in the target broadcast queue.

In some feasible implementations, after storing the broadcast message in the specific linked list in the target broadcast queue, the AMS may read the broadcast message from the linked list of the target broadcast queue according to a broadcast message scheduling priority and by using a scheduling processor, and may further instruct, by using a communications mechanism such as binder, an application program that monitors the currently read broadcast message to process the broadcast message. Specifically, the AMS may invoke a broadcast receiver that is registered by each application program with the AMS in advance to execute the broadcast message, so as to schedule the broadcast message.

Further, in some feasible implementations, the AMS may perform special processing on a received abnormal broadcast message. During specific implementation, if a quantity of broadcast messages from an application program (that is, a specified application program) that are received by the AMS within a preset time threshold is greater than a preset quantity threshold, that is, the AMS receives excessive broadcast messages from the specified application program within the preset time threshold, the specified application program may be set as an abnormal application program. In this case, an abnormal broadcast message brings a negative experience effect to the user, and therefore a user experience assurance priority of the abnormal application program may be set as a lowest priority. Specifically, the AMS may determine the abnormal application program as a third application program of a third user experience assurance priority. Further, the AMS may create a broadcast queue (set as a third broadcast queue) for the third application program, and set a scheduling priority of a broadcast message stored in the third broadcast queue as a third broadcast message scheduling priority. During specific implementation, to ensure preferential processing of a broadcast message sent by a normally running application program, the AMS may set the third broadcast message scheduling priority as a lowest priority, that is, the third broadcast message scheduling priority is lower than the second broadcast message scheduling priority.

Figure 5:
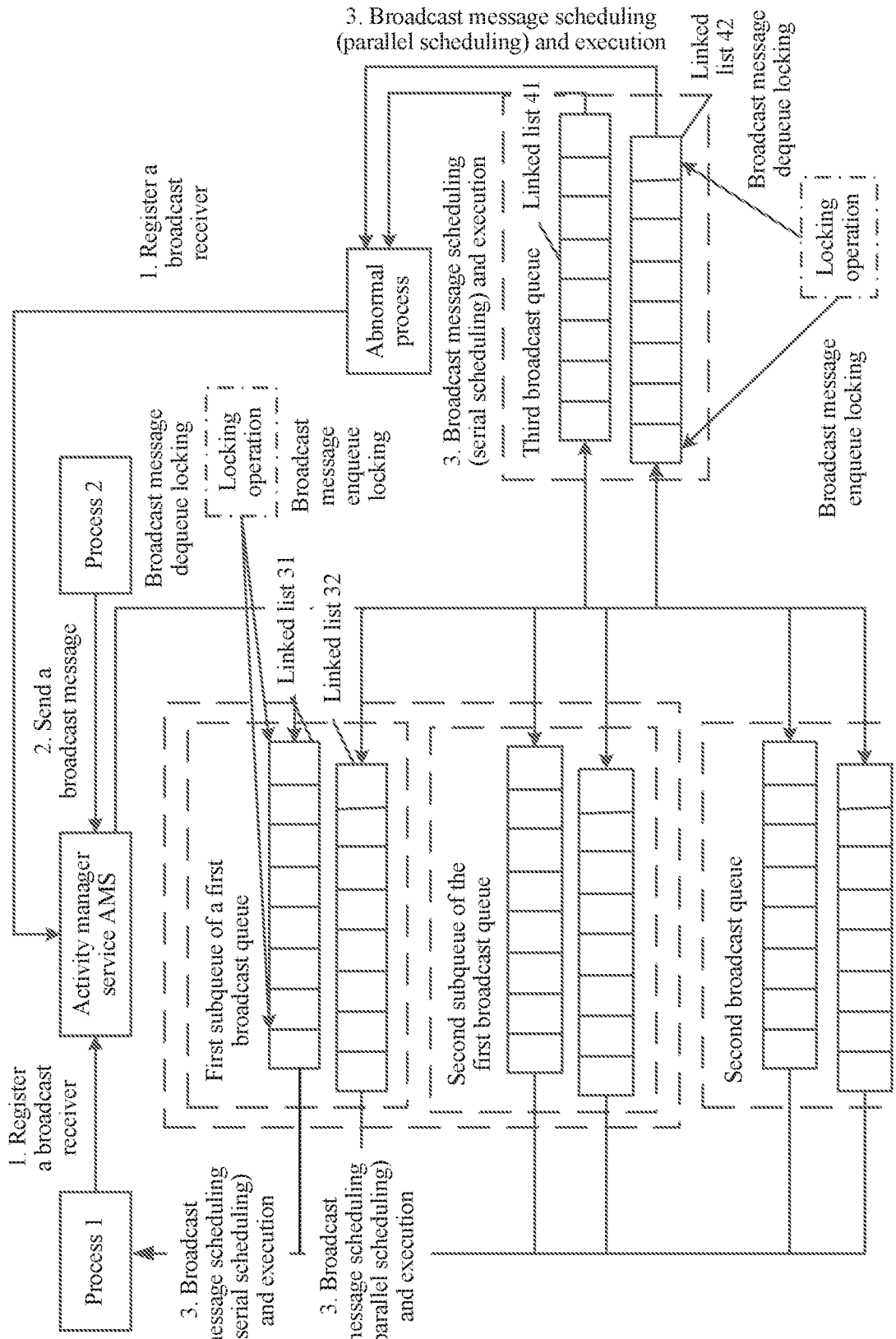
FIG. 5 is another schematic diagram of a broadcast queue according to an embodiment of the present disclosure.

Further, in some feasible implementations, the AMS may also set at least two broadcast message linked lists for the third broadcast queue. The at least two linked lists include a third linked list used to store a broadcast message of a third message type and a fourth linked list used to store a broadcast message of a fourth message type. The third message type may be specifically ordered broadcast messages sent by the abnormal application program, and the fourth message type may be specifically non-ordered broadcast messages sent by the abnormal application program. As shown in FIG. 5, FIG. 5 is another schematic diagram of a broadcast queue according to an embodiment of the present disclosure. The AMS may set a broadcast queue for the third application program, and set two linked lists in the broadcast queue. One linked list (set as an ordered linked list, for example, a linked list 41 in FIG. 5) is used to store ordered broadcast messages sent by the third application program. The other linked list (set as a non-ordered ink list, for example, a linked list 42 in FIG. 5) is used to store non-ordered broadcast messages sent by the third application program.

During specific implementation, after receiving a broadcast message (that is, a specified broadcast message) sent by the abnormal application program, the AMS may determine a message type of the specified broadcast message according to message type identification carried in the broadcast message. If the type of the specified broadcast message is the third message type (for example, ordered broadcast messages sent by the abnormal application program), the specified broadcast message may be stored in the third linked list (for example, an ordered broadcast linked list in FIG. 5). If the type of the specified broadcast message is the fourth message type (for example, non-ordered broadcast messages sent by the abnormal application program), the specified broadcast message may be stored in the fourth linked list (for example, a non-ordered broadcast linked list in FIG. 5).

Further, in some feasible implementations, after storing the broadcast message sent by the abnormal application program in a related linked list, the AMS may read the broadcast message from the linked list according to a priority rank of the third broadcast message scheduling priority and by using a scheduling processor, and may further instruct, by using a communications mechanism such as binder, an application program (for example, an abnormal process in FIG. 5) that monitors a broadcast message sent by the abnormal application program to process the broadcast message, so as to schedule the broadcast message. After all broadcast messages in the third broadcast queue are scheduled and executed, if it is detected that the abnormal application program (that is, the specified application program) exits running, the third broadcast queue may be deleted to save memory space. If a broadcast message sent by the abnormal application program is subsequently received, a broadcast queue used to store the broadcast message sent by the abnormal application program is then created, to avoid terminal storage space waste caused by a vacant broadcast queue.

In this embodiment of the present disclosure, the terminal may differentially store broadcast messages according to types of application programs that send the broadcast messages, and may further set different scheduling priorities for broadcast messages sent by application programs of different types, so as to ensure preferential processing of the broadcast message from the key application program such as the system application program or the preset application program, ensure smooth running of the key application program, and improve broadcast message management applicability. Further, in this embodiment of the present disclosure, the abnormal application program that sends a broadcast storm within the preset time threshold may be identified, and a broadcast message that is abnormally sent is managed by dynamically creating a broadcast queue of the abnormal application program to store the abnormal broadcast message, so as to avoid impact exerted by the abnormal application program on other application programs. Therefore, smooth running of the key application program is further ensured, and user experience of the terminal is improved.

A specific procedure of the method provided in the embodiments of the present disclosure is mainly described above. An implementation location and a running status of the method provided in the embodiments of the present disclosure are described below with reference to FIG. 6 and by using an Android operating system as an example. For a more specific method procedure, refer to the foregoing embodiment.

Figure 6:
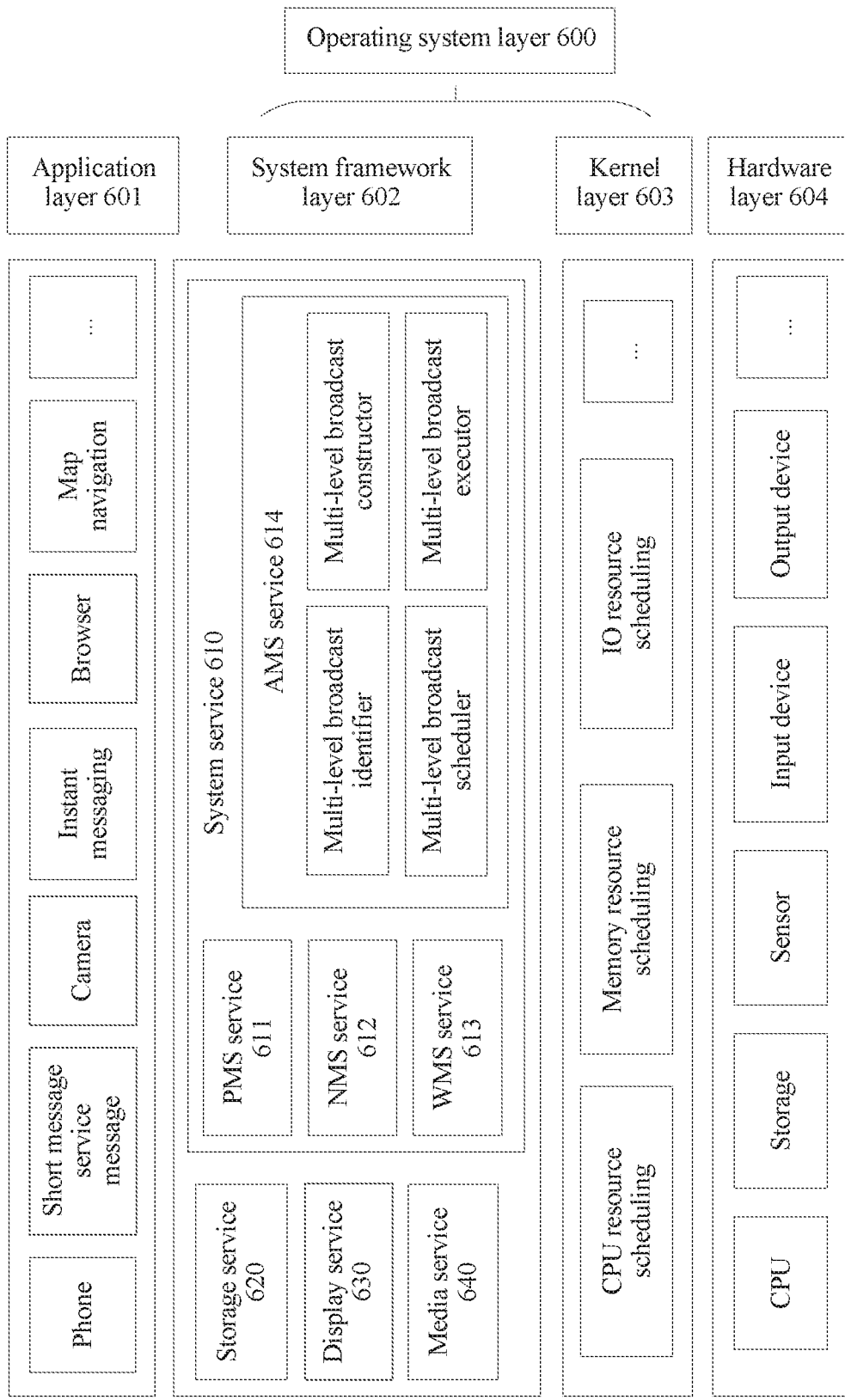
FIG. 6 is a schematic structural diagram of a computer system according to an embodiment of the present disclosure.

Referring to FIG. 6, FIG. 6 is a schematic structural diagram of a computer system according to an embodiment of the present disclosure. The computer system may be the terminal device provided in the foregoing embodiment of the present disclosure, or may be a computer device of another type. The computer system includes an application layer 601, an operating system layer 600, and a hardware layer 604. It should be noted that modules presented in the schematic structural diagram of the computer system shown in FIG. 6 are merely some but not all modules of the system. The modules included in the schematic structural diagram shown in FIG. 6 are merely examples. A specific structure may be determined according to actual application, and is not limited herein.

The operating system may be an Android operating system, or may be another operating system applicable to the method provided in the embodiments of the present disclosure, and is not limited herein. The operating system layer 600 is further divided into a system framework layer 602 and a kernel layer 603. The operating system layer 600 in FIG. 6 may be regarded as specific implementation of the operating system 182 in FIG. 1. The system framework layer 602 includes a system service 610, a storage service 620, a display service 630, a media service 640, and the like. The system service 610 includes a power manager service (PMS) 611, a notification manager service (NMS) 612, a window manager service WMS) 613, an AMS service 614, and the like. The AMS service 614 includes a multi-level broadcast identifier, a multi-level broadcast constructor, a multi-level broadcast scheduler, a multi-level broadcast executor, and the like. The kernel layer 603 includes modules such as a CPU resource scheduling module, a memory resource scheduling module, and an IO resource scheduling module. The CPU resource scheduling module is configured to configure CPUs of broadcast executors corresponding to different broadcast queues. The memory resource scheduling module is configured to configure memories of broadcast executors corresponding to different broadcast queues. The IO resource scheduling module is configured to configure IO resource obtaining priorities of broadcast executors corresponding to different broadcast queues, and the like.

Any one of the foregoing implementations of the embodiments of the present disclosure may be implemented in the AMS service 614 shown in FIG. 6.

In some feasible implementations, in the AMS service, the multi-level broadcast identifier is configured to determine a target application program and a target broadcast queue corresponding to the target application program, for example, a first broadcast queue, a second broadcast queue, or a third broadcast queue. The multi-level broadcast constructor is configured to separately create, according to preset broadcast queue configuration information, the first broadcast queue used to store a broadcast message sent by a first application program, the second broadcast queue used to store a broadcast message sent by a second application program, and the third broadcast queue used to store a broadcast message sent by a third application program. The multi-level broadcast constructor is further configured to configure resources such as broadcast message scheduling priorities of the first broadcast queue, the second broadcast queue, and the third broadcast queue. For example, the multi-level broadcast constructor may set that a broadcast message scheduling priority of the first broadcast queue is higher than a broadcast message scheduling priority of the second broadcast queue, and the broadcast message scheduling priority of the second broadcast queue is higher than a broadcast message scheduling priority of the third broadcast queue. The multi-level broadcast scheduler is configured to schedule, according to the target application program and the target broadcast queue corresponding to the target application program that are obtained by the multi-level broadcast identifier by means of processing, the target broadcast queue to perform processing such as broadcast message distribution. For example, for the first application program, the multi-level broadcast scheduler chooses the first broadcast queue in multiple broadcast queues created by the multi-level broadcast constructor, to perform broadcast distribution. The multi-level broadcast executor is configured to provide a broadcast distribution processing capability, and may separately process broadcast in the first broadcast queue, the second broadcast queue, and the third broadcast queue.

Further, as shown in FIG. 6, the application layer 601 of a terminal may include applications such as a phone, a short message service message, a camera, instant messaging, a browser, and map navigation. Applications presented in FIG. 6 are merely some but not all applications at the application layer 601, and may be specifically set according to an actual application requirement. No limitation is imposed herein. During specific implementation, the application layer 601 in FIG. 6 may be regarded as specific implementation of the application program 181 in FIG. 1. No limitation is imposed herein. The hardware layer 604 of the terminal includes hardware modules such as a central processing unit (CPU), a sensor, a storage, an input device, and an output device (which may be specifically a display device). Hardware modules presented in FIG. 6 are merely some but not all modules at the application layer 604, and may be specifically set according to an actual application requirement. No limitation is imposed herein. The central processing unit may be equivalent to specific implementation of the processor 150 in FIG. 1, and the storage may be equivalent to the storage 180 in FIG. 1, and includes a memory and an external storage. The input device in FIG. 6 may be equivalent to the input device 132 in FIG. 1. The output device in FIG. 6 may be equivalent to the display device 140 in FIG. 1, for example, a liquid crystal display (LCD), a holographic) imaging device, or a projector. Certainly, in addition, the hardware layer 604 may include one or more sensors (equivalent to the sensor 120 in FIG. 1). The hardware layer 604 may further include a power supply, a photographing device, an RF circuit, and a WiFi module shown in FIG. 1, and may further include another hardware module that is not shown in FIG. 1, for example, a memory controller or a display controller. No limitation is imposed herein.

Figure 7:
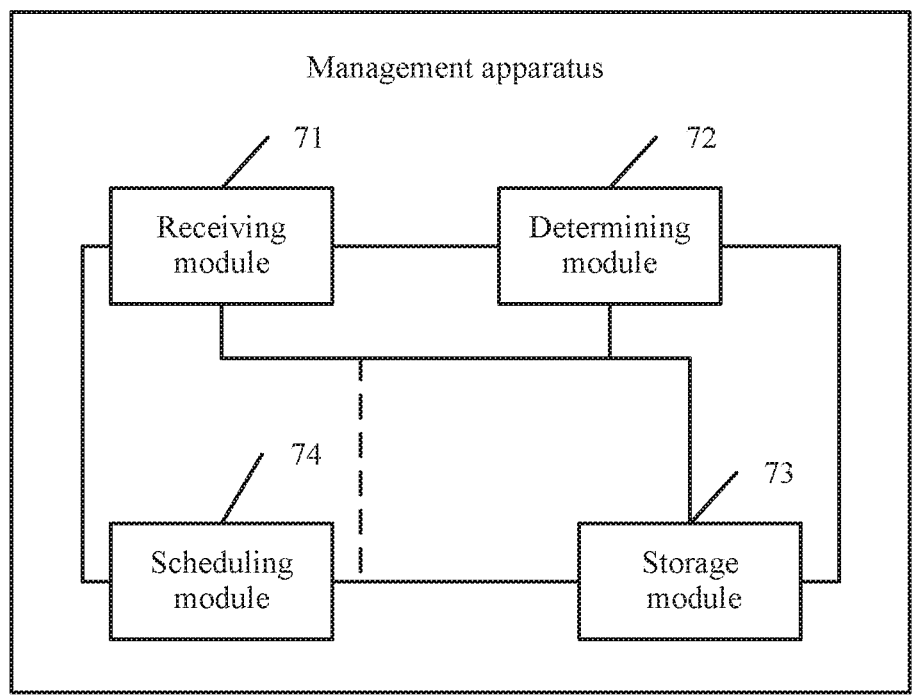
FIG. 7 is a schematic structural diagram of a broadcast message management apparatus according to an embodiment of the present disclosure.

Referring to FIG. 7, FIG. 7 is a schematic structural diagram of a broadcast message management apparatus according to an embodiment of the present disclosure. The broadcast message management apparatus provided in this embodiment of the present disclosure may be specifically the terminal in the foregoing embodiment, and the broadcast message management apparatus may include:

a receiving module 71, configured to receive a broadcast message sent by a target application program;

a determining module 72, configured to: determine a user experience assurance priority of the target application program, and determine a target broadcast queue corresponding to the user experience assurance priority of the target application program from at least two preset broadcast queues, where each of the at least two broadcast queues is corresponding to a broadcast message scheduling priority;

a storage module 73, configured to save the broadcast message received by the receiving module 71 in the target broadcast queue determined by the determining module 72; and a scheduling module 74, configured to: when a broadcast message scheduling request is received, schedule, according to a target broadcast message scheduling priority corresponding to the target broadcast queue, the broadcast message saved in the target broadcast queue by the storage module 73.

Figure 8:
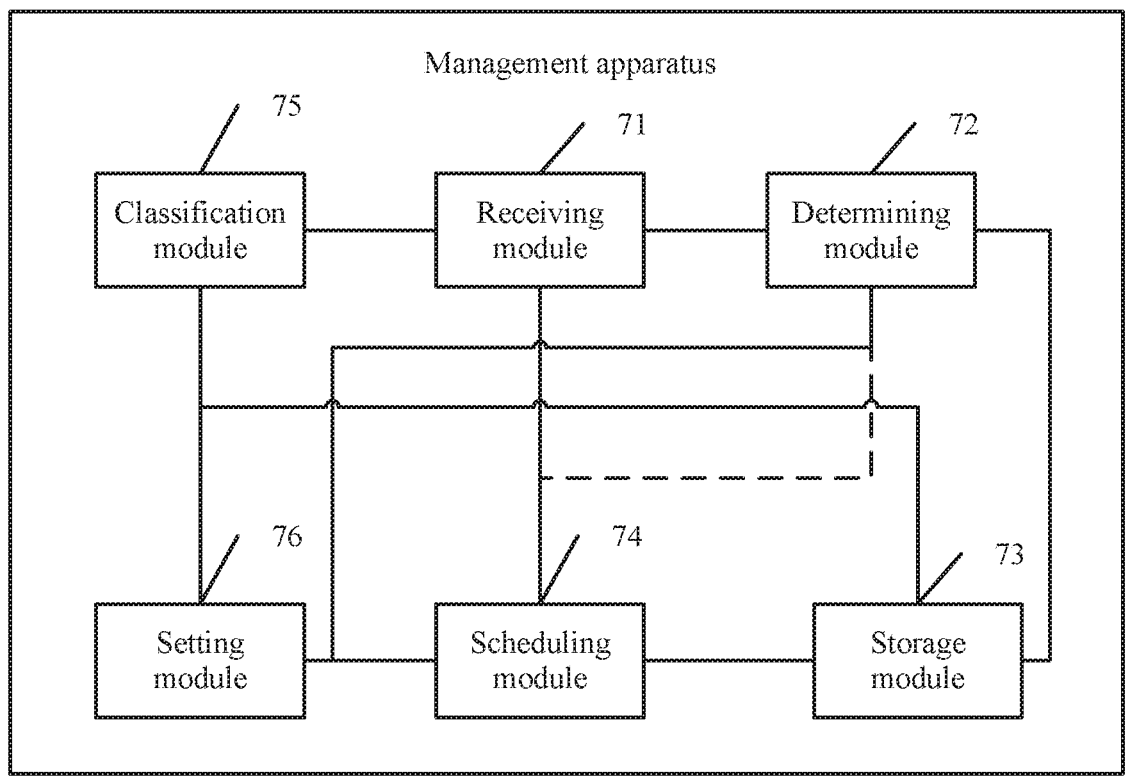
FIG. 8 is another schematic structural diagram of a broadcast message management apparatus according to an embodiment of the present disclosure.

In some feasible implementations, referring to FIG. 8, FIG. 8 is another schematic structural diagram of a broadcast message management apparatus according to an embodiment of the present disclosure. The management apparatus provided in this embodiment of the present disclosure further includes:

a classification module 75, configured to classify application programs of a terminal into application programs of at least two user experience assurance priorities according to user experience assurance priorities of the application programs, where the application programs of at least two user experience assurance priorities include a first application program of a first user experience assurance priority and a second application program of a second user experience assurance priority, and the first user experience assurance priority is higher than the second user experience assurance priority; and a setting module 76, configured to: create a first broadcast queue corresponding to the first application program obtained by the classification module 75 by means of classification and a second broadcast queue corresponding to the second application program, and set a first broadcast message scheduling priority of the first broadcast queue and a second broadcast message scheduling priority of the second broadcast queue, where the first broadcast message scheduling priority is higher than the second broadcast message scheduling priority.

The determining module 72 is specifically configured to: when it is determined that the target application program is the first application program, determine the first broadcast queue as the target broadcast queue; or when it is determined that the target application program is the second application program, determine the second broadcast queue as the target broadcast queue.

In some feasible implementations, the first application program includes a system application program and a preset application program of the terminal;

the first broadcast queue includes a first subqueue used to store a broadcast message from the system application program and a second subqueue used to store a broadcast message from the preset application program; and the determining module 72 is specifically configured to: when it is determined that the target application program is the system application program of the terminal, determine the first subqueue of the first broadcast queue as the target broadcast queue; or when it is determined that the target application program is the preset application program, determine the second subqueue of the first broadcast queue as the target broadcast queue.

In some feasible implementations, the application programs of at least two user experience assurance priorities further include a third application program of a third user experience assurance priority;

the determining module 72 is further configured to:
when a quantity of broadcast messages from a specified application program that are received within a preset time threshold is greater than a preset quantity threshold, determine the specified application program as the third application program; and the setting module 76 is further configured to:
create a third broadcast queue corresponding to the third application program determined by the determining module 72, determine the third broadcast queue as the target broadcast queue, and save a broadcast message from the third application program in the third broadcast queue by using the storage module; and set a scheduling priority of the broadcast message stored in the third broadcast queue as a third broadcast message scheduling priority.

The third broadcast message scheduling priority is lower than the second broadcast message scheduling priority.

In some feasible implementations, the setting module 76 is further configured to:

when the scheduling module 74 schedules and executes all broadcast messages stored in the third broadcast queue, and it is detected that the specified application program exits running, delete the third broadcast queue.

During specific implementation, the management apparatus may execute, by using the modules built in the management apparatus, implementations described in the steps in the broadcast message management method. For details, refer to implementations described in the foregoing embodiments. Details are not described herein again.

In this embodiment of the present disclosure, when receiving the broadcast message, the terminal may save the broadcast message in the target broadcast queue according to the user experience assurance priority of the target application program that sends the broadcast message. The target broadcast queue is further corresponding to the broadcast message scheduling priority. During broadcast message scheduling, broadcast message scheduling processing may be further performed according to the broadcast message scheduling priority. Broadcast messages are stored as different classes according to user experience assurance priorities of application programs, so as to improve broadcast message storage controllability. A broadcast message scheduling priority is set for the broadcast queue that stores the broadcast message, so that controllability of the broadcast message scheduling priority is improved, and further, broadcast message processing efficiency is improved, and user experience of the application program is improved. The target application program provided in this embodiment of the present disclosure may be a background application program or may be a foreground application program. That is, the method provided in this application may be used to manage a broadcast message from the foreground application program, or may be used to manage a broadcast message from the background application program. Therefore, operations are flexible, and broadcast message management applicability is improved.

In the specification, claims, and accompanying drawings of the present disclosure, the terms "first", "second", "third", "fourth", and so on are intended to distinguish between different objects but do not indicate particular order. In addition, the terms "include", "have", or any other variant thereof, are intended to cover a non-exclusive inclusion. For example, a process, a method, a system, a product, or a device that includes a serial of steps or units is not limited to the listed steps or units, but optionally further includes an unlisted step or unit, or optionally further includes another inherent step or unit of the process, the method, the system, the product, or the device.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is disclosed above is merely example embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A broadcast message management method, wherein the method is used to manage a broadcast message sent by a foreground application program of a terminal or a broadcast message sent by a background application program of the terminal, and the method comprises:

classifying application programs of the terminal into application programs of at least two user experience assurance priorities according to user experience assurance priorities of the application programs, wherein the application programs of at least two user experience assurance priorities comprise a first application program of a first user experience assurance priority and a second application program of a second user experience assurance priority, and the first user experience assurance priority is higher than the second user experience assurance priority;

in response to receiving a quantity of broadcast messages sent by a target application program within a preset time threshold that is greater than a preset quantity threshold, determining a target broadcast queue corresponding to the target application program, wherein a broadcast message scheduling priority of the target broadcast queue is lower than broadcast message scheduling priorities of other broadcast queues in the terminal;

saving the quantity of broadcast messages in the target broadcast queue; and in response to receiving a broadcast message scheduling request, scheduling, according to the broadcast message scheduling priority of the target broadcast queue, the quantity of broadcast messages stored in the target broadcast queue.

2. The method according to claim 1, wherein the method further comprises:

when all broadcast messages stored in the target broadcast queue are scheduled and executed, and it is detected that the target application program exits running, deleting the target broadcast queue.

3. A terminal device, comprising a memory and a processor, wherein the memory is configured to store program code, and the processor is configured to invoke the program code stored in the memory to perform:

classifying application programs of the terminal into application programs of at least two user experience assurance priorities according to user experience assurance priorities of the application programs, wherein the application programs of at least two user experience assurance priorities comprise a first application program of a first user experience assurance priority and a second application program of a second user experience assurance priority, and the first user experience assurance priority is higher than the second user experience assurance priority;

in response to receiving a quantity of broadcast messages sent by a target application program within a preset time threshold that is greater than a preset quantity threshold, determining a target broadcast queue corresponding to the target application program, wherein a broadcast message scheduling priority of the target broadcast queue is lower than broadcast message scheduling priorities of other broadcast queues in the terminal device;

saving the quantity of broadcast messages in the target broadcast queue; and in response to receiving a broadcast message scheduling request, scheduling, according to the broadcast message scheduling priority of the target broadcast queue, the quantity of broadcast messages stored in the target broadcast queue.

4. The terminal device according to claim 3, wherein the processor is further configured to perform:

when all broadcast messages stored in the target broadcast queue are scheduled and executed, and it is detected that the target application program exits running, deleting the target broadcast queue.

5. A non-transitory storage medium, comprising program code, wherein when the program code is performed by a processor in a terminal device, the program code causes the processor to perform:

classifying application programs of the terminal into application programs of at least two user experience assurance priorities according to user experience assurance priorities of the application programs, wherein the application programs of at least two user experience assurance priorities comprise a first application program of a first user experience assurance priority and a second application program of a second user experience assurance priority, and the first user experience assurance priority is higher than the second user experience assurance priority;

in response to receiving a quantity of broadcast messages sent by a target application program within a preset time threshold that is greater than a preset quantity threshold, determining a target broadcast queue corresponding to the target application program, wherein a broadcast message scheduling priority of the target broadcast queue is lower than broadcast message scheduling priorities of other broadcast queues in the terminal device;

saving the quantity of broadcast messages in the target broadcast queue; and in response to receiving a broadcast message scheduling request, scheduling, according to the broadcast message scheduling priority of the target broadcast queue, the quantity of broadcast messages stored in the target broadcast queue.

6. The non-transitory storage medium according to claim 5, wherein the processor is further configured to perform:

when all broadcast messages stored in the target broadcast queue are scheduled and executed, and it is detected that the target application program exits running, deleting the target broadcast queue.

* * * * *